US008627060B2

(12) United States Patent
Hart

(10) Patent No.: US 8,627,060 B2
(45) Date of Patent: Jan. 7, 2014

(54) TRUSTED NETWORK INTERFACE

(75) Inventor: Steven R. Hart, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 669 days.

(21) Appl. No.: 12/431,160

(22) Filed: Apr. 28, 2009

(65) Prior Publication Data

US 2009/0300353 A1 Dec. 3, 2009

Related U.S. Application Data

(60) Provisional application No. 61/053,595, filed on May 15, 2008, provisional application No. 61/049,422, filed on Apr. 30, 2008.

(51) Int. Cl.
*H04L 9/00* (2006.01)
(52) U.S. Cl.
USPC ............................. 713/153; 713/156; 726/22
(58) Field of Classification Search
USPC ............................. 713/176, 153, 156; 726/22
See application file for complete search history.

(56) References Cited

U.S. PATENT DOCUMENTS

| 5,615,268 | A  | * | 3/1997 | Bisbee et al. ............... 713/176 |
| 7,029,049 | B2 | * | 4/2006 | Rockafellow et al. ....... 296/37.8 |
| 7,054,844 | B2 | * | 5/2006 | Fletcher et al. .............. 705/75 |
| 7,089,303 | B2 | * | 8/2006 | Sheymov et al. ............. 709/224 |
| 7,240,201 | B2 | * | 7/2007 | Neufeld et al. .............. 713/168 |
| 7,406,713 | B2 | * | 7/2008 | Sheymov et al. ............. 726/23 |

| 2001/0048745 | A1 | * | 12/2001 | Sheymov et al. ............. 380/247 |
| 2004/0139334 | A1 |   | 7/2004  | Wiseman |
| 2005/0193429 | A1 |   | 9/2005  | Demopoulos et al. |
| 2007/0199061 | A1 |   | 8/2007  | Byres et al. |
| 2007/0261112 | A1 | * | 11/2007 | Todd et al. ..................... 726/11 |
| 2009/0164522 | A1 | * | 6/2009  | Fahey .......................... 707/104.1 |
| 2009/0165026 | A1 | * | 6/2009  | Paknad et al. ................ 719/328 |

FOREIGN PATENT DOCUMENTS

| JP | 110755 A | 4/2004 |
| KR | 10-2006-0079714 A | 7/2006 |
| KR | 10-2006-0129618 A | 12/2006 |

OTHER PUBLICATIONS

NIJ special report: Investigations Involving the Internet and Computer Networks, US Department of Justice, Jan. 7, pp. 1-140.*
U.S. Dept. of Justice, http://www.it.ojp.gov/default.aspx?area=privacy&page=1284, Mar. 20, 2012.*
International Search Report dated Dec. 22, 2009 in PCT Application No. PCT/US2009/042133, 3 pages.

* cited by examiner

*Primary Examiner* — Jung Kim
*Assistant Examiner* — Thomas Ho
(74) *Attorney, Agent, or Firm* — Kilpatrick Townsend & Stockton LLP

(57) ABSTRACT

Systems and methods for combating and thwarting attacks by cybercriminals are provided. Network security appliances interposed between computer systems and public networks, such as the Internet, are configured to perform defensive and/or offensive actions against botnets and/or other cyber threats. According to some embodiments, network security appliances may be configured to perform coordinated defensive and/or offensive actions with other network security appliances.

22 Claims, 3 Drawing Sheets

TRUSTED NETWORK INTERFACE

CROSS-REFERENCES TO RELATED APPLICATIONS

This application claims the benefit of priority to U.S. Provisional Application No. 61/049,422, titled "TRUSTED NETWORK INTERFACE," filed Apr. 30, 2008, and to U.S. Provisional Application No. 61/053,595, titled "TRUSTED NETWORK INTERFACE," filed May 15, 2008, the content of which is hereby incorporated by reference for all purposes.

The present application is being filed concurrently with the following related U.S. patent application, which is assigned to ViaSat, Inc., the assignee of the present invention, and the disclosure of which is hereby incorporated by reference for all purposes: U.S. patent application Ser. No. 12/431,190, titled "NETWORK SECURITY APPLIANCE," filed on Apr. 28, 2009.

BACKGROUND OF THE INVENTION

Criminals have been able to gain control of millions of personal computer systems (PCs) for various nefarious activities, such as generating spam messages, propagating viruses and worms used to compromise additional computer systems, stealing personal information for identity theft, and launching denial of service (DOS) attacks on computer systems. Networks of compromised machines (also known as "zombies") are referred to as botnets. A botnet may include hundreds, thousands, or even millions of zombie computer systems that are under the control of the botnet. For example, the "Storm" botnet has been estimated to control as many as one to two million zombie computer systems to fewer than 160,000 zombie computer systems. Another botnet, the "bobax" or "Kraken" network has been estimated to control between 160,000 and 400,000 zombie computer systems, and the "Srizbi" network has been estimated to control 315,000 zombie computer systems.

Cybercriminals in control of botnets often offer the services of the botnets to the highest bidder. Often the botnet may be used to launch attacks, such as denial of server (DOS) attacks, on the computer systems of government and/or private entities. Terrorist groups may also harness botnets to stage attacks against government information systems and/or other critical infrastructure, such as power plants, air traffic control computer systems, and particularly well-funded terrorist organizations may have the resources to capture their own network of zombie computer systems for use in staging attacks. The size of a botnet can be quite extensive. Cyber terrorist groups may have as many as millions of zombie computer systems under their control, providing the terrorist groups with significantly more computing resources at their disposal for staging attacks the government and/or private entities currently often have at their disposal for thwarting such attacks.

BRIEF SUMMARY OF THE INVENTION

Systems and methods for operating a trusted network for thwarting cyber attacks by botnets and/or other cyber threats are provided. According to some embodiments, the trusted network is configurable to command network appliances interposed between computer systems and a public network, such as the Internet, to perform offensive and/or defensive actions against botnets and/or other cyber threats.

According to an embodiment of the present invention, a method for operating a trusted network interface for monitoring network traffic passing through a plurality of network security appliances is provided. The method includes: receiving, at a management system, warrant information identifying a network security appliance to execute one or more actions specified in the warrant information; generating a control command instructing the network security appliance identified in the warrant information to execute the one or more actions specified in the warrant information; digitally signing the control command with a digital certificate associated with the management system; encrypting the digitally signed control command; transmitting the digitally signed and encrypted control command to the network security appliance identified in the warrant information; and receiving confirmation from the network security appliance that the one or more actions specified in the warrant information have been executed.

According to yet another embodiment of the present invention, a computer network is provided. The computer network includes a plurality of network security appliances, each network security appliance being interposed between a computer system and a public network, and a management system configured to transmit control commands to the plurality of network security appliances via a public network. The network further includes a judicial control system configured to receive warrant information identifying a network security appliance to execute one or more actions specified in the warrant information. The judicial control system is configured to transmit the warrant information to the management system, and the management system is configured to transmit a control command to a network security appliance identified in the warrant information received from the judicial control system, the control command instructing the network security appliance to execute the one or more actions specified in the warrant information. The management system is also configured to receive confirmation from the network security appliance that the one or more actions specified in the warrant information have been executed.

DETAILED DESCRIPTION OF THE INVENTION

Systems and methods are provided that enable governments and/or private entities to effectively fight back against botnets and other cyber threats. A large, widely-distributed network of computer systems and network security appliances is provided to defend against swarm attacks staged using zombie computer systems under control of a botnet and to mount effective counter-attacks on these botnets. According to some embodiments of the present invention, the computer systems comprising this widely distributed network are physically distributed over a wide geographic area and are assigned different network addresses to minimize the risk of denial of service attacks and/or other types of attack from being able to cripple the entire network of computers used to defend against and/or mount attacks against botnets.

Figure 1:
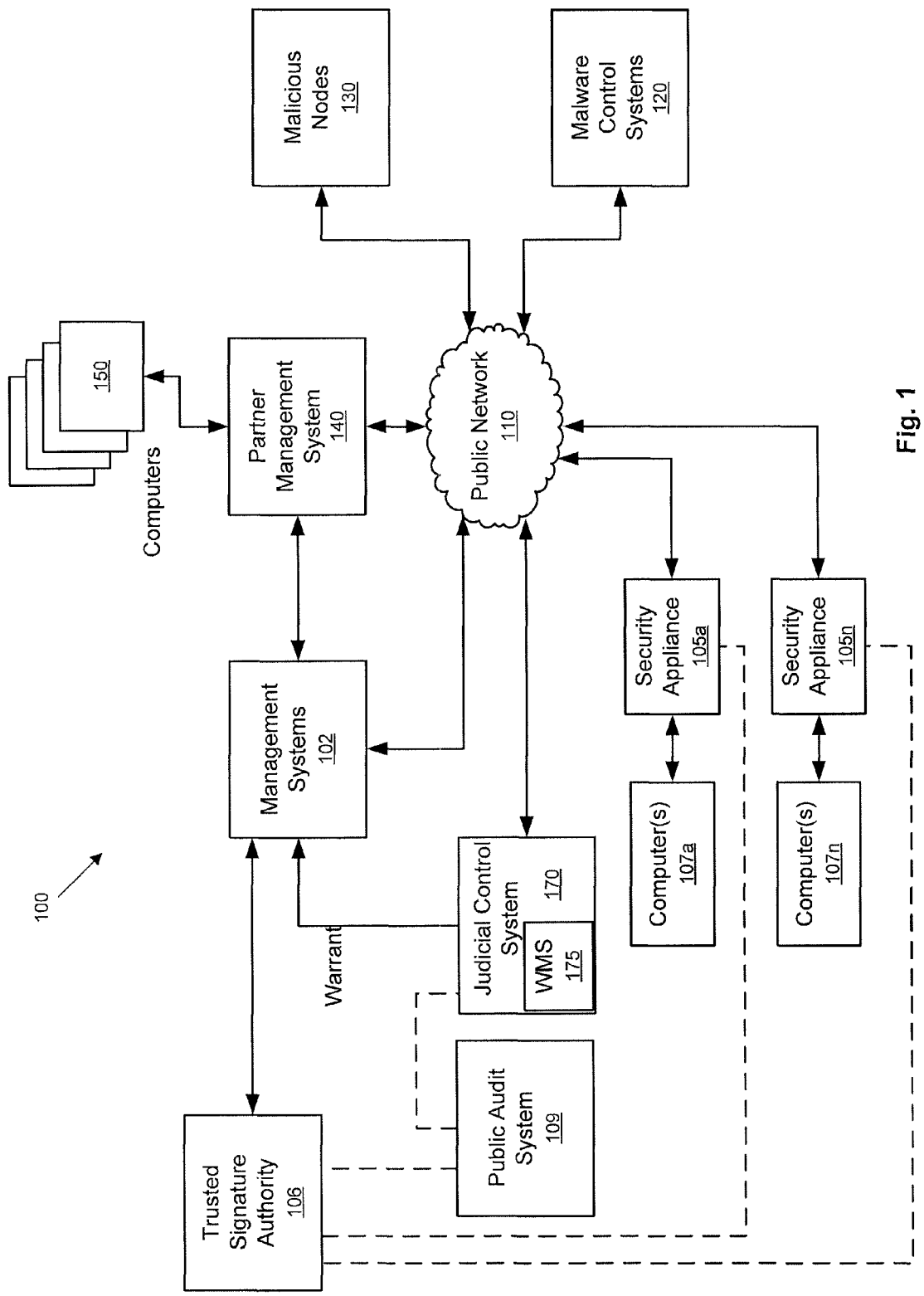
FIG. 1 is a block diagram of a computer network that may be used to take defensive and/or offensive actions against a cyber threats according to an embodiment of the present invention.

FIG. 1 is a block diagram of a computer network 100 that may be used to take defensive and/or offensive actions against a cyber threat according to an embodiment of the present invention. Network 100 includes a plurality of security appliances 105(a)-105(n). Each security appliance is connected to a public network 110, such as the Internet, and are interposed between one or more computer systems 107(a)-107(n) and public network 110. Computer systems 107(a)-107(n) may be a standalone computer system or may comprise a local network of computers that is connected to public network 110 via a security appliance. Network traffic between computer systems 107(a)-107(n) and public network 110 passes through one of the security appliances 105(a)-105(n).

Security appliances 105(a)-105(n) disclosed herein enable end-users to participate in identifying and responding to malicious activity by interposing a security appliance in the network connection between the end-user's computer systems 107(a)-107(n) and public network 110. Computer system 107(a)-107(n) operate as if they were directly connected to pubic network 110, except data being communicated between computer system 107(a)-107(n) and public network 110 passes through a security appliance while in transit to its final destination. No special software and/or hardware needs to be installed in the end users' computer system 107(a)-107(n), thereby eliminating the risk to the government and/or private entities operating network 100 of installing hardware and/or software in end-users' computer systems.

Installing hardware and/or software in end-user's personal computers would place a burden on the government and/or private entities operating network 100 to provide technical support for issues arising with end-users' personal computers, and would place a burden on the end-users to trust that the software and/or hardware installed on their computer systems will not compromise the function of their computer systems (much less any personal information stored on the computer systems) and would require that the users keep their computer systems powered on and connected to the network all the time. Installing software and/or hardware on privately owned computer systems might also raise issue of violation of civil liberties and/or criminal statutes. Cyber criminals, of course, are not concerned about such issues when they take control of privately owned personal computers for various nefarious purposes, but the government or private entities making use of privately owned personal computer systems to fight back against botnets and other cybercrime activities would be subjected to legal and judicial scrutiny. Implementing the security appliances as standalone devices avoids these concerns. A malfunctioning security appliance may merely be disconnected or bypassed by an end user without any adverse effects on the end user's computer system.

According to embodiments of the present invention, security appliances 105(a)-105(n) may be configured to exchange data in a peer to peer fashion using public network 110. For example, security appliances 105(a)-105(n) may exchange information about conditions on various parts of public network 110, information regarding potential threats, and/or command protocols from management systems 102. Data exchanged between security appliances may be protected by various encryption methods known to the art to enable the security appliances to communicate securely across public network 110. According to an embodiment of the present invention, each security appliance may be provided with an independently verifiable security certificate that may be used to validate that data communicated from the security appliance. Security appliances 105(a)-105(n) may each be assigned a unique serial number at the time that the device is manufactured and that is physically integrated into a trusted component of the device that resists physical alterations and modification via electronic attacks.

Security appliances, such as security appliances 105(a)-105(n), may be mass marketed to millions of end users for installation of the device between their home network and their Internet connection. The government and/or a private entities may subsidize the cost of the devices (making the device free or available to end users at a discounted rate) to encourage end users to install the security appliances in exchange for the security appliances being able to make use of at least a small portion of the bandwidth of each end user's Internet connection. In exchange for being able to utilize a portion of the bandwidth of each end user's Internet connection, the security appliance provides various protection mechanisms that directly benefit the end user, such as a firewall, anti-virus protection, anti-spam protection, and/or other protection mechanisms that would make it more difficult for cyber criminals to take control of computer systems protected by the appliances. As well, these appliances may perform other functions of use to the user, such as web browsing acceleration and/or other functions. The appliance may not require maintenance or control by the end user. The appliance may be configured to automatically receive any necessary updates via the Internet from a secure data source, and if the appliance should malfunction and negatively affect the performance of the consumer's personal computer (for example, by interfering with traffic to and from the Internet) the security appliance may be easily removed or bypassed by the end user.

Management systems 102 comprise distributed control systems that send and/or receive data to security appliances 105(a)-105(n). Management systems 102 are preferably widely distributed at different geographical locations and are assigned different network addresses to thwart denial of service (DOS) and other types of attacks that may cripple the management systems 102. Management systems 102 may send data and/or commands to security appliances 105(a)-105(n) via public network 110 and receive data from security appliances 105(a)-105(n) via public network 110. The data and/or commands send to security appliances 105(a)-105(n) by management systems 102 may be secured in various ways to prevent the data and/or commands from unauthorized access while the data and/or commands is traversing public network 110. For example, various tunneling protocols may be used to communicate data between management systems 102 and security appliances 105(a)-105(n). Furthermore, data transmitted between management systems 102 and security appliances 105(a)-105(n) may be encrypted and/or secured using security certificates from Trusted Signature Authority 106 that may be used to independently verify the identity of the origin of the data. This relationship is shown as a dashed line in FIG. 1, because some out of channel method requiring physical access (such as at manufacture or through a smart card may be used to install the verification system into security appliances 105). Management systems 102 may also assess a current threat level for each security appliance 105(a)-105(n) to be used determine the amount of bandwidth and/or other resources that each security appliance 105(a)-105(n) may utilize.

Embodiments of the present invention may be used in cooperation with existing programs for fighting cybercrime. For example, management systems 102 can cooperate with one or more partner management systems 140 for fighting cybercrime. Partner management system 140 monitors data exchanged between a plurality of computer systems 150 and public network 110, and may be configured to perform various offensive and/or defensive actions in response to a cyber attack by malicious entities.

In an embodiment, partner management system 140 may comprise one or more computer systems of the "Einstein" program operated by the United States Computer Emergency Readiness Team (US-CERT), a partnership between the United States Department of Homeland Security and the public and private sectors. The Einstein program is voluntary program for United States government agencies that provides participating agencies with an automated process for collecting, correlating, analyzing and sharing computer security information among various federal government agencies, enabling cross-agency security incidents to be identified. The Einstein system is separately controlled by US-CERT, but may be configured to exchange information with management systems 102. For example, management systems 102 may be configured to communicate information regarding threats identified on the public network 110 to the Einstein system. Likewise, the Einstein system may provide management systems 102 with information regarding threats that have been identified by the Einstein system.

Malware control systems 120 comprise one or more computer systems controlled by cybercriminals for use in mounting attacks on computer systems and for spreading malicious code, such as worms or viruses, that when executed may damage or take control of infected computer systems. Malicious nodes 130 comprise one or more computer systems under control of the malware control systems 120.

In an embodiment, malware control systems 120 comprise botnet controllers used to control a botnet and malicious nodes 130 comprise zombie computer systems whose behavior may be remotely controlled by the botnet controllers. For example, a botnet controller may issue commands to zombie computer systems to execute a denial of service (DOS) attack on a particular computer system or systems. A botnet controller may also issue commands to zombie computer systems to generate spam email messages or to distribute malicious code such as a virus or a worm that attempts to compromise additional computer systems that may become zombie computers under control of the botnet. Security appliances 105(*a*)-105(*n*) attempt to identify and block traffic originating from malware control systems 120 and malicious nodes 130 from reaching computer systems 107(*a*)-107(*n*).

Judicial control system 170 is configured to receive warrant information regarding warrants issued by the government to obtain information gathered by a security appliance. For example, if suspicious traffic, such as spam, viral data, and/or other suspicious data has been sent from a particular computer system or the computer has sent large amounts of data to countries that are known havens for botnets or other malware control systems, the computer system may have become a zombie computer system under the control of a malware control server. Judicial control system 170 includes a warrant management system 175 for receiving warrant information. Warrant information may be received in a secured electronic format or entered manually from a paper warrant. In some embodiments, the warrant information may be received electronically via a secure, encrypted network connection or may be provided on a physical medium, such as a USB key flash drive or other tangible medium that can be physically secured and transported to the warrant management system 175 for entry into judicial control system 170.

In order for the government to obtain the information gathered by the security appliance, a warrant would typically need to be issued. Once a warrant is issued, the warrant information may be entered into judicial control system 170 which is in communication with management systems 102 via a secure connection. The warrant information may be encrypted or otherwise secured to ensure that the warrant data is authentic. Once the warrant has been received by the management systems 102, management systems 102 may issue commands to the security appliance to communicate data stored on the security appliance to a government entity, such as the Department of Homeland Security or other government entity responsible for investigating cyber-crime.

The security appliance may also be instructed to route a copy of all incoming and outgoing data packets to the investigating government entity, which may potentially enable the investigating entity to capture botnet control codes or other information that may be used to try to shut down the cyber criminals suspected of controlling the computer system for which the warrant was obtained. The warrant would be limited to data stored on the security appliance and to data transferred to or from the computer system through the security appliance. The warrant would not need to be directed to the data stored on the computer system itself, thereby eliminating may aspects of concern related to curtailment or violation of civil liberties. The investigating agency might also notify the owner of the computer system that the computer system has been compromised by a botnet or is otherwise under the control of cyber criminals, and the investigating agency may optionally issue a command to place a block on incoming and/or outgoing data packets. In an embodiment, the end user owning the computer system may be alerted by security appliance 105 that the end user's computer system has been compromised. In other embodiments, the end user may not be notified in order to provide authorities with the ability to collect data from the security appliance 105 and/or instruct the security appliance 105 to perform other actions without the end user disabling the security appliance 105.

Public audit system 109 comprises systems for creating an audit trail for the issuance and execution of warrants via judicial control system 170. Public audit system 109 may include an interface for tracking the status of a warrant. For example, the audit trail for a warrant may contain information regarding when the warrant was issued, when the warrant was entered into judicial control system 170, whether the warrant been executed by judicial control system 170 by issuing warrant information to management systems 102, any data gathered from security appliances 105 as a result of the warrant, and/or any actions offensive and/or defensive actions that may have been taken by security appliances 105 as a result of the warrant.

Access to public audit system 109 may be limited to those in an oversight role, such as Congress, a court issuing the warrant, and/or government investigatory agencies such as the Federal Bureau of Investigations or the Department of Homeland Security. The public audit system 109 may be issued security certificates through trusted signature authority 106 so that the origin of the requests for audit information can be verified by judicial control system 170. Requests for audit information may be transmitted from public audit system 109 to judicial control system 170 via a secure, encrypted network connection or may be provided on a physical medium, such as a USB key flash drive or other tangible medium that can be physically secured and transported to judicial control system 170. Similarly, audit information may be transmitted from judicial control system 170 to public audit system 109 via a secure, encrypted network connection or may be provided on a physical medium.

Figure 2:
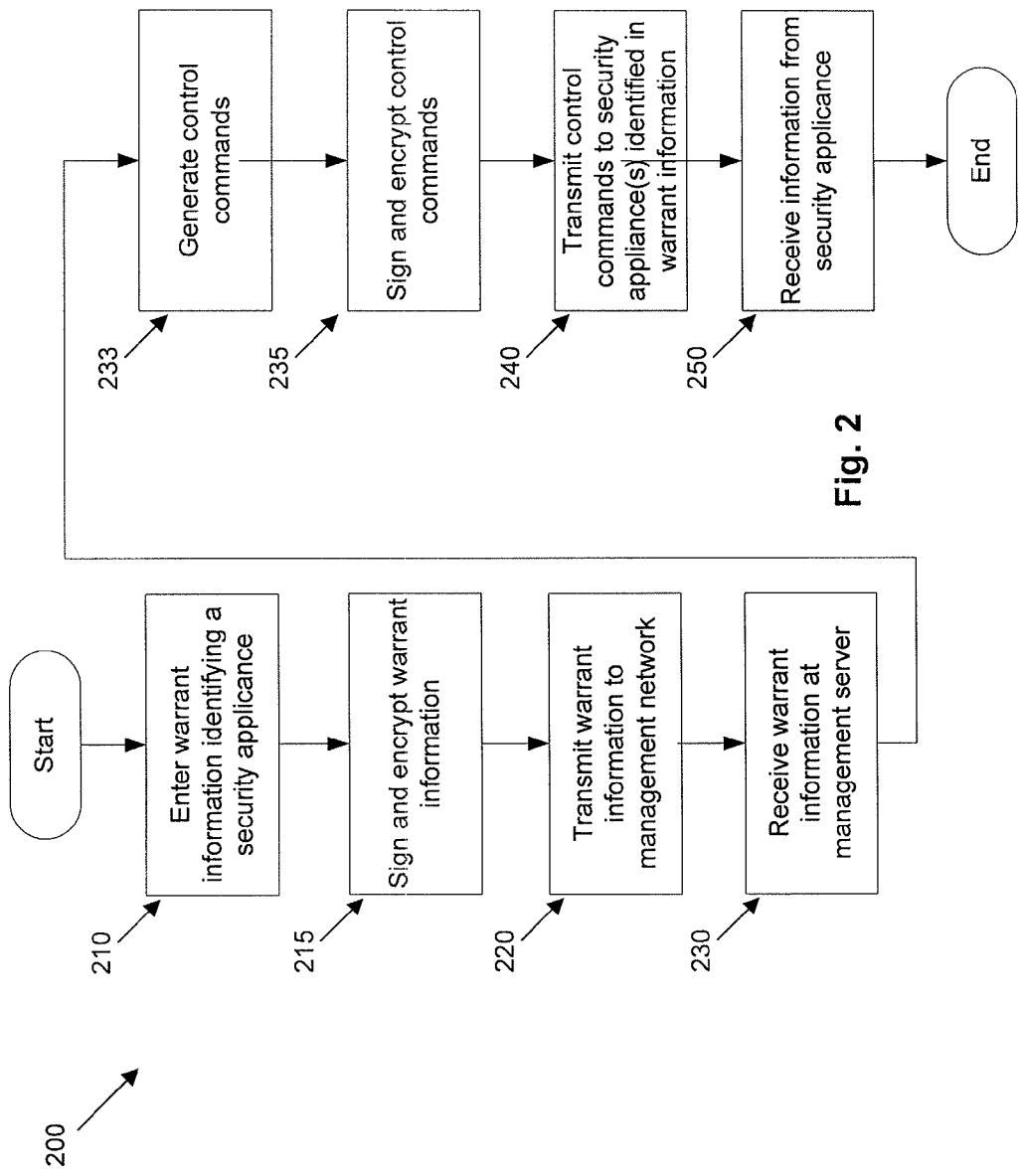
FIG. 2 is a high level flow diagram of a method for a secure warrant processing system for obtaining information from a security appliance according to an embodiment of the present invention.

FIG. 2 is a high level flow diagram of a method 200 for a secure warrant processing system for obtaining information from a security appliance 105 according to an embodiment of the present invention. The judicial control system provides a secure interface for entering warrant information specifying a security appliance from which information about incoming and/or outgoing data packets are to be received. As described above, each security appliance 105 may be identified by a unique serial number that is built into a trusted component of the security appliance. The warrant may specify this unique serial number and/or a network address of a computer or computers 207 whose traffic to and from public network 110 pass through security appliance 105.

Method 200 begins with step 210, where, a user may enter warrant information into judicial control system 170 identifying a security appliance and/or a network address of a computer system suspected of being compromised by a botnet or being used for other cyber criminal activity. At step 215, judicial control system 170 signs and encrypts the warrant information. The control message is signed by judicial control system 170 through trusted signature authority 106 so that the origin of the control warrant information can be verified by management systems 102 receiving the signed warrant information. The signed warrant information is also encrypted to ensure that contents of the control message cannot be intercepted and the contents of the warrant information monitored by cyber criminals.

At step 220, judicial control system 170 transmits the signed and encrypted warrant information to management systems 102 via a secure data path. According to an embodiment, the secure data path may comprise a secure network connection between judicial control system 170 and management systems 102. According to other embodiments of the present invention, the secure data path between may comprise transporting of a copy of the warrant information from judicial control system 170 on a computer-readable medium an optical disk, a flash drive, or other tangible computer readable medium.

At step 230, management systems 102 receive the warrant information transmitted via the secure data path. The management system uses the warrant information to identify a security device from which information is to be gathered using the warrant information. As described above, the warrant information may identify the security device using a unique identifier assigned to the security appliance at the time that the security appliance is manufactured. Alternatively, according to other embodiments of the present invention, the security appliance may be identified according to a network address of a computer system that the security appliance computer or computers 207 whose traffic to and from public network 110 pass through security appliance 105.

At step 233, management systems 102 generate a control message including one or more control commands to instructing a security appliance to perform various actions according to the warrant information. The control commands may instruct the security appliance to provide information about data passing through the security appliance to management systems 102, and/or may instruct the security appliance to take defensive and/or offensive actions against a perceived threat, such as a botnet. For example, the control commands may include a monitoring command that instructs the security appliance to transmit a copy of data passing through the security appliance to management systems 102.

At step 235, management systems 102 sign and encrypt the control message. The control message is signed by management systems 102 through trusted signature authority 106 so that the origin of the control message can be verified by security appliances 105 receiving the signed messages. The signed message is also encrypted to ensure that contents of the control message cannot be intercepted and the contents of the messages monitored by cyber criminals. The signed and encrypted control message is then transmitted to security appliances 105 identified in the warrant information (step 240).

At step 250, management systems 102 receives information from security appliance 105 in response to the control commands received from management systems 102. The information may comprise information about data passing through security appliance 105. According to some embodiments, security appliance may also transmit a copy of all data packets passing through the security device to management systems 102 for analysis. According to some embodiments, management systems 102 may also transmit control commands to security appliance 105 that instructs the security appliance to take defensive actions, such as blocking all traffic from passing through the security appliance 105, and/or offensive actions, such as participating in a denial of service attack on the botnet. Method 200 terminates after step 250.

Figure 3:
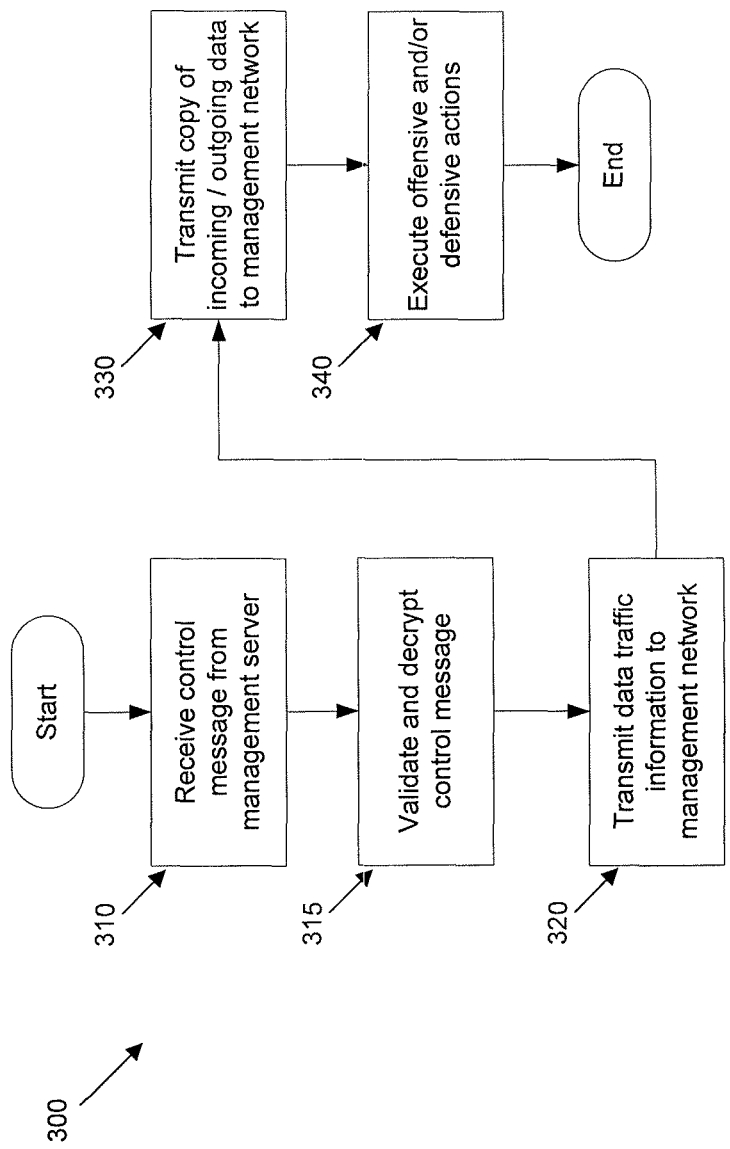
FIG. 3 is a high level flow diagram of a method for operating a security appliance in response to receiving a control message from management systems according to an embodiment of the present invention.

FIG. 3 is a high level flow diagram of a method 300 for operating a security appliance 105 in response to receiving a control message from management systems 102 according to an embodiment of the present invention. Method 300 begins with step 310, where security apparatus 105 receives a control message from management systems 102 via public network 110. The control message may be issued by management systems 102 in response to the receipt of a warrant, as described above with respect to method 200, and control message may include one or more control commands to be executed by the security appliance 105 in accordance with the warrant information received by management system 102. In an embodiment, the control commands may include a monitoring command that instructs the security appliance to transmit a copy of data passing through the security appliance to management systems 102.

At step 315, the security appliance validates the signature used to sign the monitoring command and decrypts the control message. The signature used to sign the monitoring command authenticates the origin of the message. If the monitoring command is not properly signed or encrypted, this may indicate that the monitoring command originated from a malicious source and will not be processed by the security appliance 105. In an embodiment, security appliance 105 may report the receipt of a improperly signed or encrypted monitoring command to management systems 102.

At step 320, security apparatus 105 transmits information that security appliance 105 has collected about data traffic passing through security appliance 105. For example, security appliance 105 may have collected and stored information such as the number of SPAM messages that the device has blocked, the number of worms and/or computer viruses that the security device has blocked, and/or other information. This information may include data collected about traffic originating from public network 110 or from computer system 207.

At step 330, security appliance 105 may transmit a copy of data packets passing through security appliance 105 to management systems 102 if the control message received by the security device included a monitoring command. The copy of data packets transmitted to management systems 102 are signed and encrypted by security appliance 105 before being transmitted to management systems 102 via public network 110.

At step 340, the control message received by the security appliance 105 may also instruct the security appliance 105 to perform defensive and/or offensive actions in response to a perceived threat. Method 300 terminates after step 340.

Embodiments of the present invention provide a security appliance that enables a computer system to participate in a public network without being vulnerable to attacks as a result of that participation. Various hardware protection mechanisms and/or software or firmware protections may be included in the security appliance to enable the computer system to fully participate in bidirectional network communications, while limiting the probability that the computer system will be subject to attacks or be taken over as a zombie system included in a botnet.

Having described several embodiments, it will be recognized by those skilled in the art that various modifications, alternative constructions, and equivalents may be used without departing from the spirit of the invention. For example, the above elements may merely be a component of a larger system, wherein other rules may take precedence over or otherwise modify the application of the invention. Accordingly, the above description should not be taken as limiting the scope of the invention, which is defined in the following claims.

What is claimed is:

1. A method for operating a trusted network interface for monitoring network traffic passing through a plurality of network security appliances, comprising:
   receiving, at a management system, warrant information that is derived from a judicial warrant, and comprises:
     a judicially executable action that is executable only with approval, wherein the judicially executable action includes authorization for participating in a denial of service attack;
     an approval from the judicial warrant to execute the judicially executable action; and
     an identification of at least some of the plurality of network security appliances each to execute the judicially executable action;
     wherein the judicial warrant satisfies legal requirements approving an act to be performed;
   generating a control command instructing the at least some of the plurality of network security appliances identified in the warrant information to execute the judicially executable action in an orchestrated manner according to a coordinated plan of action;
   digitally signing the control command with a digital certificate associated with the management system;
   encrypting the digitally signed control command;
   transmitting the digitally signed and encrypted control command to the at least some of the plurality of network security appliances identified in the warrant information; and
   receiving confirmation from the at least some of the plurality of network security appliances that the judicially executable action has been executed.

2. The method of claim 1 wherein the warrant information received at the management system is digitally signed and encrypted by a judicial control system that stores and authenticates the warrant information.

3. The method of claim 2 further comprising:
   receiving, at the judicial control system, an audit request from a public audit system; and
   in response to the audit request, providing audit information from the judicial control system to the public audit system.

4. The method of claim 3 wherein the audit request is digitally signed and encrypted by the public audit system, and wherein the audit information is digitally signed and encrypted by the judicial control system.

5. The method of claim 1 wherein the network security appliance is interposed between a computer system and a public network, and wherein all network traffic between the computer system and the public network passes through the network security appliance.

6. The method of claim 1 wherein the warrant information specifies an identifier associated with the network security appliance that uniquely identifies the network security appliance.

7. The method of claim 6 wherein the identifier associated with the network security appliance is an internet protocol (IP) address of the computer system associated with the network security appliance.

8. The method of claim 1 wherein the judicially executable action includes providing data traffic information gathered by the security appliance to the management system.

9. The method of claim 1 wherein the judicially executable action includes providing a copy of data traffic passing through the security appliance to the management system.

10. The method of claim 1 wherein the judicially executable action includes performing one or more justifiable preventative measures that would otherwise be legally disallowed without the approval in the warrant information.

11. The method of claim 1 wherein the judicially executable action includes performing one or more justifiable proactive measures that would otherwise be legally disallowed without the approval in the warrant information.

12. A computer network comprising:
   a plurality of network security appliances, each network security appliance being interposed between a computer system and a public network;
   a management system configured to transmit control commands to the plurality of network security appliances via a public network;
   a judicial control system configured to:
     receive warrant information that is derived from a judicial warrant, and comprises:
       a judicially executable action that is executable only with approval, wherein the judicially executable action includes authorization for participating in a denial of service attack;
       an approval from the judicial warrant to execute the judicially executable action; and
       an identification of at least some of the plurality of network security appliances to execute the judicially executable action;
       wherein the judicial warrant satisfies legal requirements approving an act to be performed;
     digitally sign and encrypt the warrant information; and
     transmit the digitally signed and encrypted warrant information to the management system;
   wherein the management system is configured to transmit a control command to the at least some of the plurality of network security appliances identified in the warrant information received from the judicial control system, the control command instructing the at least some of the plurality of network security appliances to execute the judicially executable action in an orchestrated manner according to a coordinated plan of action; and
   wherein the management system is configured to receive confirmation from the at least some of the plurality of network security appliances that the judicially executable action has been executed.

13. The computer network of claim 12 further comprising:
   a public audit system configured to transmit an audit request to the judicial control system; and wherein the judicial control system is further configured to receive the audit request from the public audit system and to provide audit information to the public audit system in response to the audit request.

14. The computer network of claim 13 wherein the audit request is digitally signed and encrypted by the public audit system, and wherein the audit information is digitally signed and encrypted by the judicial control system.

15. The computer network of claim 12 wherein all network traffic between the computer system and the public network that the network security appliance is interposed between passes through the network security appliance.

16. The computer network of claim 12 wherein the warrant information specifies an identifier associated with the network security appliance that uniquely identifies the network security appliance.

17. The computer network of claim 16 wherein the identifier associated with the network security appliance is an internet protocol (IP) address of the computer system associated with the network security appliance.

18. The computer network of claim 12 wherein the judicially executable action includes providing data traffic information gathered by the security appliance to the management system.

19. The computer network of claim 12 wherein the judicially executable action includes providing a copy of data traffic passing through the security appliance to the management system.

20. The computer network of claim 12 wherein the judicially executable action includes performing one or more justifiable preventative measures that would otherwise be legally disallowed without the approval in the warrant information.

21. The computer network of claim 12 wherein the judicially executable action includes performing one or more justifiable proactive measures that would otherwise be legally disallowed without the approval in the warrant information.

22. A method for preventing malicious cyber-attacks, the method comprising:
   receiving, at a management system, warrant information that is derived from a judicial warrant, wherein the judicial warrant satisfies legal requirements approving an act to be performed, said act to be performed only with approval, wherein the judicial warrant comprises an approval to order a plurality of network security appliances to perform a denial of service attack carried out according to a coordinated plan of action, wherein each of the plurality of network security appliances:
      is interposed between a computer system and a public network; and
      is configured to monitor data passing between the computer system and the public network; and
      wherein the denial of service attack prevents at least some data from passing between at least one of the computers and the public network that at least one of the plurality of network security appliances is interposed between;
   instructing, in an orchestrated manner and from the management system, the plurality of network security appliances to carry out the denial of service attack in a manner consistent with the warrant information, wherein instructing in an orchestrated manner comprises:
      generating a control command instructing the plurality of network security appliances to perform the denial of service attack;
      encrypting the digitally signed control command; and
      transmitting the digitally signed and encrypted control command to the plurality of network security appliances; and
   receiving confirmation from at least some of the plurality of network security appliances that the denial of service attack has been performed.

* * * * *